United States Patent
Schaumann (10) Patent No.: US 10,844,532 B2
(45) Date of Patent: Nov. 24, 2020

(54) SPRING DEVICE FOR SPRING-MOUNTING A FUNCTIONAL UNIT OF AN ELECTRICAL APPLIANCE, AND METHOD FOR INFLUENCING A SPRING DEVICE OF THIS KIND

(71) Applicant: E.G.O. Elektro-Geraetebau GmbH, Oberderdingen (DE)

(72) Inventor: Uwe Schaumann, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 112 days.

(21) Appl. No.: 16/142,134

(22) Filed: Sep. 26, 2018

(65) Prior Publication Data
US 2019/0136435 A1    May 9, 2019

(30) Foreign Application Priority Data

Sep. 29, 2017 (DE) .......... 10 2017 217 416

(51) Int. Cl.
*D06F 37/22* (2006.01)
*F16F 9/02* (2006.01)
(Continued)

(52) U.S. Cl.
CPC .............. *D06F 37/22* (2013.01); *F16F 1/041* (2013.01); *F16F 1/121* (2013.01); *F16F 3/04* (2013.01);
(Continued)

(58) Field of Classification Search
CPC ....... F16F 2222/02; F16F 1/379; D06F 37/20; D06F 2222/00; D06F 37/203; D06F 37/22
See application file for complete search history.

(56) References Cited

U.S. PATENT DOCUMENTS 2,699,660 A * 1/1955 Kirby .................... D06F 37/203
68/23.3
4,220,231 A * 9/1980 Richter ................... F16D 43/25
192/82 T (Continued)

FOREIGN PATENT DOCUMENTS

DE   1836825 U    8/1961
DE   1921502 A1   11/1970
(Continued)

OTHER PUBLICATIONS

European Patent Office, European Search Report for European Patent Application No. 18195363.9, dated Feb. 27, 2019, Europe, No English Translation Available.

*Primary Examiner* — Bradley Duckworth
(74) *Attorney, Agent, or Firm* — Alston & Bird LLP (57) ABSTRACT

A spring device for spring-mounting a laundry drum of a washing machine has at least one spring means and coupling means for coupling the spring means to the spring device. The spring means has a spring constant or spring properties which are temperature-dependent and can be varied by a temperature effect on the spring means. As an alternative or in addition, the coupling means are designed in a temperature-dependent manner in such a way that they vary their coupling effect between the spring means and the spring device by a temperature effect. Heating means are provided for the spring means and/or for the coupling means in order to warm up the said spring means and/or coupling means and to change their spring properties or their coupling effect. Therefore, the spring-mounting arrangement of the laundry drum can be thermally, and therefore quickly and simply, varied.

29 Claims, 2 Drawing Sheets

(51) Int. Cl.
*F16F 1/04* (2006.01)
*F16F 1/12* (2006.01)
*F16F 13/00* (2006.01)
*F16F 15/02* (2006.01)
*F16F 15/023* (2006.01)
*F16F 15/067* (2006.01)
*F16F 3/04* (2006.01)
*F16F 15/027* (2006.01)
*F16F 15/06* (2006.01)
*F16F 1/02* (2006.01)

(52) U.S. Cl.
CPC ............ *F16F 9/029* (2013.01); *F16F 9/0281* (2013.01); *F16F 13/002* (2013.01); *F16F 15/022* (2013.01); *F16F 15/0232* (2013.01); *F16F 15/0275* (2013.01); *F16F 15/06* (2013.01); *F16F 15/067* (2013.01); *D06F 2222/00* (2013.01); *F16F 1/024* (2013.01); *F16F 2222/02* (2013.01); *F16F 2224/0208* (2013.01); *F16F 2224/0258* (2013.01); *F16F 2228/066* (2013.01); *F16F 2230/0005* (2013.01)

(56) References Cited

U.S. PATENT DOCUMENTS

| | | | | |
|---|---|---|---|---|
| 4,531,988 | A * | 7/1985 | Todoroki | G12B 1/00 148/402 |
| 5,207,081 | A * | 5/1993 | Fuse | D06F 37/20 68/23.1 |
| 6,336,541 | B1 * | 1/2002 | Belfiore | D06F 37/302 192/116.5 |
| 6,394,239 | B1 * | 5/2002 | Carlson | D06F 37/20 188/267.1 |
| 9,022,185 | B2 * | 5/2015 | Kanioz | D06F 37/20 188/272 |
| 9,897,159 | B2 * | 2/2018 | Marble | F16F 9/523 |
| 10,288,140 | B2 * | 5/2019 | Xu | D06F 37/22 |
| 10,501,881 | B2 * | 12/2019 | Jung | F16F 7/09 |
| 10,508,378 | B2 * | 12/2019 | Lv | D06F 37/203 |
| 2004/0226321 | A1 * | 11/2004 | Park | D06F 37/20 68/23.1 |
| 2008/0044283 | A1 * | 2/2008 | Schmaling | B64C 27/51 416/134 A |
| 2011/0113832 | A1 * | 5/2011 | Ackermann | D06F 37/20 68/23.1 |
| 2011/0180684 | A1 * | 7/2011 | West | F16F 1/3615 248/557 |
| 2014/0262645 | A1 | 9/2014 | Modrzejewski et al. | |
| 2015/0267771 | A1 | 9/2015 | Modrzejewski et al. | |
| 2015/0292589 | A1 * | 10/2015 | McGuire | F16F 1/02 267/141 |
| 2018/0142754 | A1 * | 5/2018 | Xu | F16F 7/09 |
| 2018/0209085 | A1 * | 7/2018 | Xu | D06F 37/24 |
| 2019/0003101 | A1 * | 1/2019 | Lv | D06F 34/18 |
| 2019/0055687 | A1 * | 2/2019 | Deshpande | D06F 37/40 |

FOREIGN PATENT DOCUMENTS

| | | |
|---|---|---|
| EP | 2778056 A1 | 9/2014 |
| JP | S5662450 U | 5/1981 |
| JP | S58155285 A | 9/1983 |
| WO | WO-2008/088197 A1 | 7/2008 |
| WO | WO 2013/113688 A1 | 8/2013 |

* cited by examiner

SPRING DEVICE FOR SPRING-MOUNTING A FUNCTIONAL UNIT OF AN ELECTRICAL APPLIANCE, AND METHOD FOR INFLUENCING A SPRING DEVICE OF THIS KIND

CROSS-REFERENCE TO RELATED APPLICATIONS

This application claims priority from German Application No. 10 2017 217 416.1, filed Sep. 29, 2017, the contents of which are hereby incorporated herein in its entirety by reference.

BACKGROUND

The invention relates to a spring device for suspending and/or for spring-mounting a functional unit of an electrical appliance, which functional unit, in particular, can be moved or is moved and is therefore subject to vibrations. In particular, this electrical appliance is a washing machine or a tumble dryer comprising a laundry drum which is suspended by the spring device not only in respect of its possible movements but also can be suspended from springs for spring-mounting purposes. The invention further relates to a method for influencing a spring device of this kind.

In washing machines of the conventional type, a laundry drum is arranged in a drum receptacle and suspended with springs, generally from two springs at the top and tensioned at the side and also tensioned on two dampers at the bottom and to the side. This is known, for example, from WO 2013/113688 A1. The reason for this is that, when the laundry drum rotates, in particular at high rotation speeds for spin-drying laundry contained therein, there may be an unbalance due to non-uniformly distributed laundry and this can lead to extreme vibrations and mechanical loading of the washing machine at high rotation speeds. The dampers are generally provided in order to damp a movement of the laundry drum so that the said movement does not become excessive. The springs and the dampers, and usually also a drive motor, are fastened to this drum receptacle. Therefore, the spring-mounted mass is relatively large.

BRIEF SUMMARY

The invention is based on the problem of providing a spring device of the kind mentioned at the outset and also a method of the kind mentioned at the outset for influencing a spring device of this kind, with which spring device and method the problems of the prior art can be solved and, in particular, it is possible to reduce vibrations during operation of a moving functional unit and to minimize mechanical loads and also the development of noise.

This problem is solved by a spring device having the features of Claim 1 and also by a method for influencing a spring device of this kind having the features of Claim 21. Advantageous and preferred refinements of the invention are the subject matter of the further claims and will be explained in more detail below. In so doing, some features are described only for the spring device or only for the method. However, irrespective of this, they are intended to be able to apply both to the spring device and also to the method on their own and independently of one another. The wording of the claims is incorporated in the description by express reference.

The spring device for suspending and/or for spring-mounting the movable functional unit of the electrical appliance has at least one spring means and also coupling means in order to couple the spring means to the spring device. The spring device can therefore also have a plurality of spring means, advantageously arranged in a manner distributed over the functional unit.

According to the invention, it is provided that, in accordance with a first option, the spring means has a constant or spring properties which are temperature-dependent and can be varied when there is a temperature effect on the spring means. In particular, the spring constant or spring properties can be varied by warming up a portion of the spring means or the entire spring means, advantageously to a determinable or settable extent for varying the spring constant or the spring properties in a determinable or settable manner.

In addition or as an alternative to varying the spring means, according to a second option, the coupling means can be designed in a temperature-dependent manner in such a way that they vary their coupling effect between the spring means and the spring device by a temperature effect.

Therefore, the spring-mounting arrangement or the spring constant thereof can be adjusted by a single one of these options or by both options. Therefore, above-mentioned resonance problems can be avoided.

For the purpose of varying the spring means, it can advantageously be provided that this is possible gradually, that is to say largely continuously. As an alternative, this can be performed in steps or else only in two steps.

For the purpose of varying the coupling effect, it can advantageously be provided that this can be varied, as it were, digitally, that is to say either a coupling effect is present, specifically such that the spring means are completely coupled to the spring device, or that no coupling effect is provided at all, that is to say the spring means are decoupled from the spring device.

Heating means are provided for the purpose of varying firstly the spring constant or spring properties and/or secondly the coupling effect in this way, the said heating means therefore advantageously being able to heat or warm up the spring means and/or the coupling means, as a result of which the spring constant or spring properties and/or the coupling effect are/is varied. A heating operation of this kind does not necessarily have to be performed for the entire spring means or the entire coupling means, but rather at least partially. Finally, it is possible, as a result, that the spring constant or spring properties are varied overall by one spring more or less or by a varied spring.

Therefore, it is possible that a suspension arrangement of the functional unit can be varied in such a way that its resonant frequency or fundamental frequency can be varied. In this respect, it is not important whether the spring constant or spring properties are changed on at least one spring means and are potentially not changed on other spring means of this spring device or whether a further spring means is additionally coupled or decoupled. In each case, the resonant frequency is changed, so that it is possible, as it were, to change the resonant frequency after it is identified that this resonant frequency is being approached, in particular with incipient stronger vibrations. If the current frequency has passed the original resonant frequency, the variation or heating operation can be reset or reversed. This will be explained in more detail below. At this resonant frequency or fundamental frequency, it is also primarily necessary to take into account that the said frequency is variable and depends on the residual moisture, the quantity of and also primarily the distribution of laundry within the drum and changes from washing cycle to washing cycle. For this reason, it is also not possible to use permanently set measures.

The advantage of changing the spring constant or spring properties and/or the coupling effect by warming up or heating, that is to say by a temperature effect, is that warming up or heating can be readily controlled, possibly can even take effect relatively quickly within a few seconds. In comparison to mechanical or electromechanical actuators, such as motors or electromagnets, relatively large forces can be exerted, without mechanically complex apparatuses for actuators of this kind which must have a sufficient degree of stability, depending on the design of the spring means and/or coupling means.

In a refinement of the invention, the spring device can have at least one main spring means and at least one additional spring means. The coupling means can then be designed for coupling, that is to say either to couple or decouple, the additional spring means to the spring device. There is then one spring more or one less overall. In this case, the coupling means are designed in a temperature-dependent manner in such a way that they vary their coupling effect between the additional spring means and the spring device by a temperature effect. The main spring means therefore remains uninfluenced. In this case, the heating means are provided to warm up the coupling means in order to change the coupling effect thereof. In this case, the main spring means and the additional spring means themselves are preferably designed without heating means for changing the spring properties; therefore only a coupling effect is varied by a temperature effect.

In a further refinement, it is possible that the coupling means are at least partially composed of a material with a so-called memory effect, advantageously of a metal alloy, that is to say of a metal, for increased stability and a particularly clearly pronounced and defined memory effect. In a first state which can also be regarded as the basic state, the coupling means connect the additional spring means in a non-functionally effective manner to the spring device, so that the additional spring means is functionally separated or decoupled from the spring device. In this case, the said additional spring means can preferably further be provided on or fastened to the spring device, but not act as a spring or not make a contribution to the spring constant or the spring properties. In a second state which can be regarded as a state of change, the additional spring means is coupled in a functionally effective manner to the spring device or connected in such a way that the additional spring means makes a contribution to the spring constant or influences the spring properties of the spring device. Owing to this coupling or supplementary coupling of the additional spring means, generally in the form of a type of mechanical parallel connection to other spring means or else to the main spring means, the additional spring means makes a contribution, as it were additively, to the suspension arrangement.

The heating means according to the invention are then advantageously designed to heat the portion composed of the material with a memory effect. This can be performed directly by the heating element bearing directly against this portion with a memory effect or being fitted thereto or even being mounted thereon. This is particularly well suited to a portion composed of a metal alloy for the memory effect since, in this case, a sufficient degree of temperature resistance is also provided for direct contact with the heating means. As an alternative, the portion with a memory effect can also be heated without contact, for example by radiant heat by means of a radiant heating device, as a result of which distances of a few centimetres can be bridged. Inductive heating is likewise possible, the portion with a memory effect then, however, having to be ferromagnetically and electrically conductive for this purpose.

Varying the state of the portion with a memory effect can either be such that the spring device is operated mainly in the basic state and this state is left for the purpose of changing to the state of change, in order to, as described above, as it were overcome a resonant frequency, only with the aid of the heating means. When the said resonant frequency is reliably overcome, that is to say the actual current frequency in a state without the additional spring means would be higher than the resonant frequency, for example because a laundry drum now rotates so rapidly that the resonant frequency would be exceeded without the additional spring means, the additional spring can therefore be decoupled again or the spring device can then return to the basic state. As an alternative, varying the state of the portion with a memory effect can be such that the spring device is operated mainly in the state of change and this state is left for the purpose of changing to the basic state only with the aid of the heating means.

In an alternative fundamental refinement of the invention, the spring means can be a metal spring, in particular a helical spring. This metal spring itself can then be at least partially composed of a metal alloy with the temperature-dependent memory effect. In this case, the spring constant or the spring properties of a spring means itself can be influenced by means of the heating means. The heating means are also correspondingly designed for this purpose. It may be the case that the said heating means do not have to heat the entire spring means, but rather only the region which is composed of the metal alloy with a memory effect. As an alternative, the entire spring means can also be composed of a metal alloy of this kind, but only partially heated, so that substantially the entire spring means is then warmed up by heat flow. In this case, the spring means can be shortened or lengthened, for example on account of varying the spring means by the memory effect, this then correspondingly causing a higher or a lower spring constant or harder or softer spring means, as an alternative as it were changing the spring prestress as spring property.

It can advantageously be provided here that the spring device likewise again has at least one main spring means and at least one additional spring means. The additional spring means is then that which is composed of the material or a metal alloy with a memory effect. Owing to the memory effect, the spring constant or the spring properties of the additional spring means can be changed to a great extent in such a way that, in one case, it is as it were in no way involved in the suspension or in no way varies the said suspension, but in the other case makes a full contribution. However, the main spring means is then still present and effective in each case. In this case, for example in the case of a washing machine, spin-drying can be performed at the full prespecified rotation speed only with the main spring means which then withstands the prevailing loads even under permanent operation for a few minutes. The additional spring means then have to be switched on only for overcoming the resonant frequency as mentioned above, this usually lasting for only a few seconds.

In a yet further fundamental alternative refinement of the invention, the additional spring means and/or the main spring means are/is a pneumatic spring which has an air volume for the spring properties. Pneumatic springs of this kind are known. This air volume is located in an air chamber as is usually provided in pneumatic springs. When using a pneumatic spring, the spring device should have at least one further spring composed of metal, in particular in the form of a main spring means, since spring means of this kind composed of metal have a better degree of linearity in respect of their spring constant and are robust when used daily or permanently. This applies primarily in the abovementioned case of use in a washing machine. In the case of a washing machine, the rotating laundry drum is mounted in a drum receptacle. The functional unit is therefore the drum receptacle together with the rotating laundry drum therein. The spring device then also acts on the drum receptacle and, respectively, holds it.

The abovementioned heating means for warming up purposes and changing the spring properties or the spring constant can then be associated with the said air chamber and therefore the air volume or adjoin them. The heating means can advantageously be arranged on the outside on the air chamber, alternatively in the air chamber for more direct and more rapid heating of the air volume in the air chamber. It is also possible to mount the heating means directly onto a chamber wall of the air chamber, that is to say either on an inner side or on an outer side of the air chamber or the air chamber wall thereof. A piston which can be moved along the air chamber or parallel to its longitudinal direction can be arranged in the air chamber, as is usually provided for pneumatic springs. This piston can separate off the air volume, wherein the air volume is, in particular, under a very high pressure and forms a spring-action element. This is known for pneumatic springs of this kind.

In a development of the invention, a piston which is arranged such that it can move along the air chamber or parallel to its longitudinal direction in the air chamber can be provided here as an alternative. This piston can separate the air chamber into a first air volume and into a second air volume, wherein both the air volumes are advantageously closed and are under high pressure, so that they both form a spring-action element. As otherwise also in the first abovementioned case, the piston can then be connected to the spring device or a housing and can be as it were spring-mounted in both movement directions. The two air volumes are each closed off in this case, and at least one of the two air volumes can be heated in this case. The heating means can be used for this purpose, wherein reference is made to the above statements in respect of the various options for arranging the heating means on the pneumatic spring or on the air chamber or in the air volumes.

At least one of the two air volumes can be heated by means of the heating means in order to vary the spring properties in this way. In order to do this for both air volumes, separate heating means which can be activated independently of one another can be provided in each case, as has been described above.

In general, a heating means can have a resistance heating element, in particular in the form of a flat heating element. Therefore, a heating effect for an air volume can be improved, in particular an air volume can be heated more rapidly. A resistance heating element of this kind can preferably be produced with a layer construction, particularly preferably in the form of a thick-layer heating element. A thick-layer heating element of this kind can either be mounted first on a carrier and this carrier can then be arranged on the air chamber or on coupling means; or as an alternative the said thick-layer heating element can be mounted directly onto a wall of the air chamber or onto the coupling means themselves.

If a portion which has a temperature-dependent memory effect, in particular a portion composed of a corresponding metal alloy, is provided in the spring device, the memory effect can be readily employed during warming up. As an alternative, the heating means can also be connected to an abovementioned air volume or thermally conductively connected to the said air volume or coupled thereto.

In an advantageous further refinement of the invention, the spring device has a damping device, so that a movement of the functional unit cannot swing or a resonance point can be avoided, in spite of all of the spring-action compensation options. A damping device, in particular a further damping device, can additionally also be further provided on the functional unit. This damping device limits a movement of the functional unit in a manner which is known per se.

In the case of a movable functional unit of an electrical appliance, such as, in particular, a laundry drum or a drum receptacle of a washing machine, which functional unit is spring-mounted in such a way that it has a resonant frequency in the process, it is therefore possible, with the aid of the invention, to change the spring properties or spring constant of the spring device or to change a resonant frequency by heating a spring means of the spring device and/or heating a coupling means by way of which a spring means is coupled to the spring device. If it is established that the functional unit with its spring-mounting arrangement is approaching a resonant frequency, this resonant frequency can be as it were somewhat shifted by switching on a heating arrangement, alternatively by switching off a heating arrangement, so that the critical situation no longer exists. In this case, the resonant frequency is advantageously approached from below and then, however, changes such that it is lower than the current frequency, so that it is as it were overcome without resonance. If the actual frequency is then above the actual resonant frequency, activation of the heating arrangement can be reset, so that the spring device is back in its original state.

In a refinement of the invention, it is possible that varying of the spring properties and/or the coupling effect is not performed continuously but rather in steps. Particularly advantageously, a total of only two steps or states can be provided, that is to say no variation or a variation of a precisely specified type. Therefore, the expenditure can be kept lower and, at the same time, it is possible to ensure that the current frequency is as it were rapidly skipped or omitted.

In a further refinement of the invention, it can be provided that varying the spring properties and/or the coupling effect is performed in accordance with prespecifications when certain frequencies or specific rotation speeds of the functional unit are crossed. The expenditure on measurement of the frequency or the rotation speed can then be kept lower. In particular, for example, a rotation speed of the functional unit can be detected, at least approximately, by means of characteristic values of a drive motor of the functional unit. This suffices for the purposes of the invention, that is to say in order to identify when a resonant frequency is being approached. In that case, even the approach limit is accordingly further determined. According to another option, a motor current of the drive motor can be detected, this being easy with a conventional motor controller, in particular in the case of conventional drive motors for washing machines too. The resonant frequency or fundamental frequency of the functional unit together with the spring-mounting arrangement including the spring device and the situation of this resonant frequency being approached and then reached can be identified on the basis of the profile of the motor current with a characteristic range. The spring device can then be varied as a countermeasure. The simple detection of the motor current, which is provided in any case in a modern washing machine controller or other controllers of an electrical appliance, is advantageous here. In the case of the resonant frequency being approached, a rapid increase in the motor current by approximately 10% can take place, that is to say for example within 5 seconds.

A resonant frequency of this kind of the functional unit of the electrical appliance including the spring-mounting arrangement or suspension and the situation of the said resonant frequency being approached can, as an alternative, be detected by means of a vibration sensor or by means of a force sensor on the functional unit. This is a precise way of detecting the situation of the resonant frequency being approached. When the resonant frequency is reached or being approached, for example at 80% or advantageously 90% to 95% of the resonant frequency, changing of the spring properties and/or the coupling effect can then be desired. A spring constant of the spring means can then be increased, for example by at least 5% or by at least 10%. At a similar frequency shortly before the resonant frequency is reached, a coupling effect is not increased gradually, but rather advantageously as it were digitally or in such a way that a spring means, which was previously not coupled to the spring device, is then connected thereto. A connection operation of this kind can be in the form of a rigid coupling operation or a rigid connection operation.

These and further features may be gathered from the claims and also from the description and the drawings, with the individual features being capable of being implemented in each case by themselves or severally in the form of sub-combinations in an embodiment of the invention and in other fields and being capable of constituting advantageous and independently patentable versions for which protection is claimed here. The subdivision of the application into individual sections and intermediate headings does not restrict the general validity of the statements made under these.

BRIEF DESCRIPTION OF THE DRAWINGS

Exemplary embodiments of the invention are schematically illustrated in the drawings and will be explained in more detail below. In the drawings.

DETAILED DESCRIPTION

Figure 1:
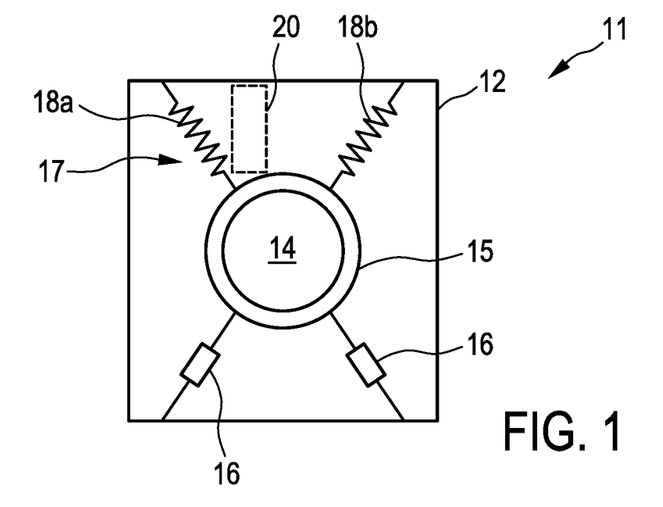
FIG. 1 shows a schematic illustration of a washing machine as an electrical appliance according to the invention comprising a spring device for a laundry drum.

FIG. 1 illustrates a simplified view of a washing machine 11 comprising a housing 12. A laundry drum 14 is held, specifically such that it can rotate, in a manner which is known per se in a laundry drum holder 15 in the said housing. A drive motor, not illustrated here, is usually fitted to the laundry drum holder 15 in order to be able to rotate the laundry drum 14.

On account of the possible occurrence of an abovementioned unbalance during rotation of the laundry drum 14, in particular at high rotation speeds such as during spin-drying for example, conventional vibrations may occur in the washing machine 11, so that the said washing machine wobbles to a considerable extent. In order to be able to absorb the said vibrations to a certain extent, a spring device 17 is provided at the top of the laundry drum holder 15. The said spring device has two springs 18a and 18b, advantageously helical springs composed of metal. The said springs allow a certain degree of movement of the laundry drum holder 15. In order to prevent the movement or vibrations from becoming too large, two dampers 16 are arranged at the bottom of the laundry drum holder 15. The said dampers do not have the task of providing suspension, but rather are intended merely to damp movements or strong vibrations. This is also known from the abovementioned prior art.

The invention provides that the washing machine 11 has a spring device 17 according to the invention, that is to say yet a further spring or an additional spring which can be provided in addition to the springs 18a and 18b or can at least partially replace the said springs. The additional means 20, illustrated using dashed lines, can comprise coupling means 25 and an additional spring 22 according to FIGS. 2 to 4. As an alternative, according to FIGS. 5 and 6, the said additional means is only one additional spring 122 and, respectively, 222 which can be influenced. According to a yet further alternative, the said additional means is a series circuit comprising a further additional spring 332, which can be influenced, and an additional spring 322 according to FIG. 7.

Figure 2:
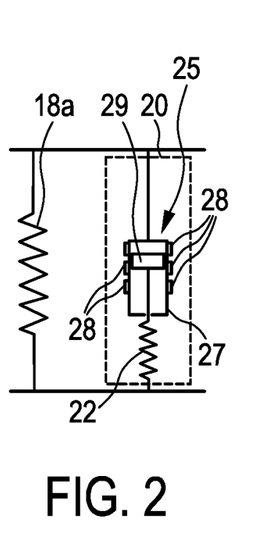
FIGS. 2 to 4 show various functional states of additional means for a spring device of the washing machine from FIG. 1.
Figure 3:
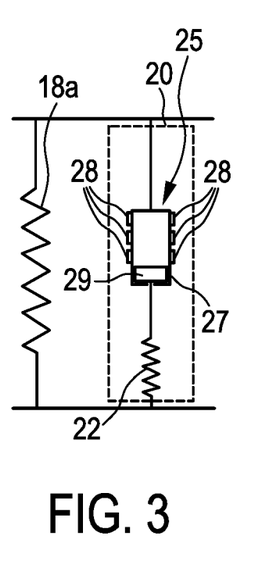
Figure 4:
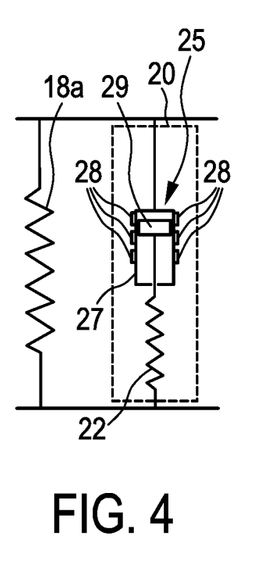

In the exemplary embodiment of FIGS. 2 to 4, the additional means 20, outlined by dashed lines, which are similar to those in FIG. 1, have an additional spring 22 at one end for coupling to the outside. According to the prior art, this additional spring 22 is advantageously constructed as a metal helical spring. In principle, it can be similar to the springs 18a or 18b. FIGS. 2 and 3 show a basic state since, specifically, the additional spring 22 is not effectively coupled to the spring device. FIG. 4 shows the state of change since, here, the additional spring 22 is actively coupled.

The coupling means 25 are designed such that the additional spring 22 is actually not actively involved in the suspension operation. Therefore, it can be provided here that, in a basic state, the coupling means 25 are not active and, respectively, the piston 29 is moved up and down largely without friction in the cylinder 27 given a corresponding movement of the laundry drum holder 15. This is shown in FIG. 3.

Heating elements 28 are arranged on the outside of the cylinder 27, advantageously mounted directly onto an outer side of the cylinder 27. The said heating elements are preferably thick-layer heating elements of the kind mentioned in the introductory part which can also be fitted directly onto metal if an insulating layer has first been applied to the surface. These heating elements 28 can heat the cylinder 27 itself in such a way that it changes such that the piston 29 is firmly clamped therein, for example because it exhibits an even greater thermal expansion upon warming up than the cylinder 27 itself. As an alternative, the cylinder 27 can be composed of a temperature-invariant material, for example Invar. The heat which is then generated by the heating elements 28 expands only the piston 29 which is then firmly clamped inside the cylinder 27, either at an arbitrary point or at a possible latching-in point. This is illustrated in FIG. 4, where the piston 29 is firmly clamped in the cylinder 27 at the same point as in FIG. 2 and is therefore fixed by warming up by the heating element 28. The additional spring 22 is now fixedly and permanently an active part of the spring device 17 at the bottom of the coupling means 25. Therefore, the spring constant of the spring device 17 has increased in accordance with expectations, and therefore the resonant frequency has also increased.

During operation of the washing machine 11, the process can proceed such that, when in the prevailing configuration, that is to say when loading the laundry drum 14 with laundry, the situation of the resonant frequency being approached is identified. This can be performed in the case of a known resonant frequency on the basis of monitoring the rotation speed of the drive motor, not illustrated, wherein it is possible to store in a table the rotation speed of the drive motor at which a resonant frequency will be reliably or very probably reached. As an alternative, a vibration sensor or force sensor, not illustrated, can be provided, which vibration sensor or force sensor identifies, on the basis of the vibrations or movements of the laundry drum holder 15 in the housing 12, when the resonant frequency will soon be reached or when approximately 90% or 95% of the resonant frequency is reached. The vibrations then increase, specifically usually sharply or in a non-linear manner. The additional spring 22 can then be coupled by corresponding influencing of the coupling means 25. If the resonant frequency is reliably overcome, advantageously at a frequency of at least 10% above the assumed resonant frequency or better even somewhat higher, the additional spring 22 can be actually removed or deactivated again, that is to say decoupled. The heating elements 28 can then be switched off, so that the coupling effect is cancelled and, by cooling down the coupling means 25, the cylinder 27 again releases the piston 29 so that it can move freely. Therefore, the heating elements 28 have to be expected to be in operation for only 10 seconds or at most 20 seconds, so that firstly excessive warming up does not take place and secondly excessive energy is not consumed either.

As an alternative to the above-described way of determining a situation of the resonant frequency being approached, the motor current can likewise also be detected or monitored in a simple manner. It is possible to identify from a characteristic profile when the resonant frequency of the rotating laundry drum 14 including the laundry drum holder 15 is being approached. The spring device 17 can then be correspondingly influenced.

If the washing machine 11 runs through the frequency response from top to bottom, that is to say if the resonant frequency could be passed from top to bottom during crossing, the same method can be repeated.

As an alternative to the embodiment shown here in FIGS. 2 to 4, the piston 29 could be arranged in a fixed manner at the top and the cylinder 27 could be arranged on it by way of the spring 22 such that the said cylinder can move along the said piston. The heating elements 28 could then be arranged on the piston and expand the said piston when they are warmed up, so that the said piston can be firmly clamped in the cylinder 27 more easily and more directly. It would then be possible to supply electrical power to the non-moving heating elements 28 on the non-moving piston 29 more easily too.

Figure 5:
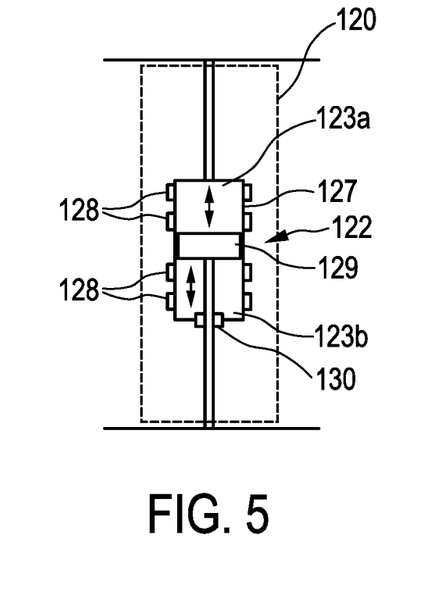
FIG. 5 shows an alternative refinement of a spring, which can be varied by heating, in the form of a pneumatic spring with two air chambers.

FIG. 5 illustrates an alternative refinement of the invention with additional means 120, outlined by dashed lines, which consist only of a temperature-dependent spring means. Here, the additional spring 122 is designed as a pneumatic spring with two air chambers 123a and 123b. These air chambers 123a and 123b are arranged in a cylinder 127, with heating elements 128 respectively being provided in an upper region and a lower region on the outer side of the said cylinder. There are no heating elements in the central region.

A piston 129 is arranged in the cylinder 127 such that it can move in a vertical and longitudinal manner. Whereas the cylinder 127, by way of its top side, is fixedly connected to the housing 12 of the washing machine 11 or to another bearing, the piston 129 is fixedly connected to, for example, the laundry drum holder 15. A fastening rod of the piston passes through a seal 130, so that the lower air chamber 123 is likewise also sealed off in an air-tight manner.

A pneumatic spring of this kind is not necessarily customary for washing machines per se, but rather in other fields, such as the suspension of chassis, in particular in bicycles or motorcycles. A spring constant of the additional spring 122 or its spring properties depend on the air pressure in the air chambers 123a and 123b. If the heating elements 128 now warm up the air in the air chambers 123a and 123b during heating operation, the air pressure there increases. Therefore, overall, the spring constant of the additional spring 122 becomes larger and harder or the spring constant increases. As a result, the spring properties of the entire spring device of the entire washing machine also change, and this entire spring constant then also increases.

Activation of varying the spring properties of the additional spring 122 according to FIG. 5 advantageously takes place once again in a regulated manner when the resonant frequency is approached in the washing machine 11 during operation or during spin-drying. A frequency limit and also identification thereof can be as described above.

Figure 6:
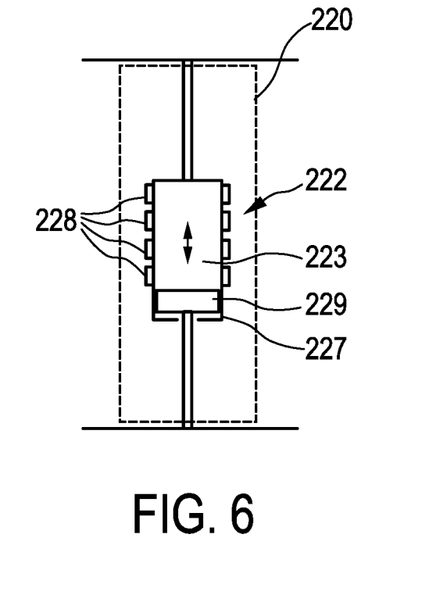
FIG. 6 shows a modification to FIG. 5 comprising a pneumatic spring which has only one air chamber.

FIG. 6 illustrates a yet further option for an additional means 220, outlined by dashed lines, for a spring device 17 illustrated in FIG. 1. In FIG. 6, an additional spring 222 is once again in the form of a pneumatic spring, but only one single air chamber 223 is provided in a cylinder 227. A piston 229 which can be moved in a longitudinal manner in the cylinder 227 presses against the compressed air in the air chamber 223 as it is moved into the cylinder, so that a pneumatic spring is produced once again. Here, the spring properties are expected to be poorer than in the additional spring 122 according to FIG. 5, but instead the structural design is considerably simpler. It is only necessary for a single air chamber 223 to be provided, and a seal beneath the piston 229 can also be dispensed with.

Heating elements 228 are provided around the air chamber 223 on the outside of the cylinder 227. The effect of the said heating elements is as described above in relation to FIG. 5; they can warm up the air volume in the air chamber 223, as a result the air pressure further additionally rises and the additional spring 222 becomes as it were harder, at least under pressure loading. This can also help to vary a resonant frequency of the entire system of the washing machine 11 briefly and in a controlled manner, so that a resonance point can be readily overcome.

Figure 7:
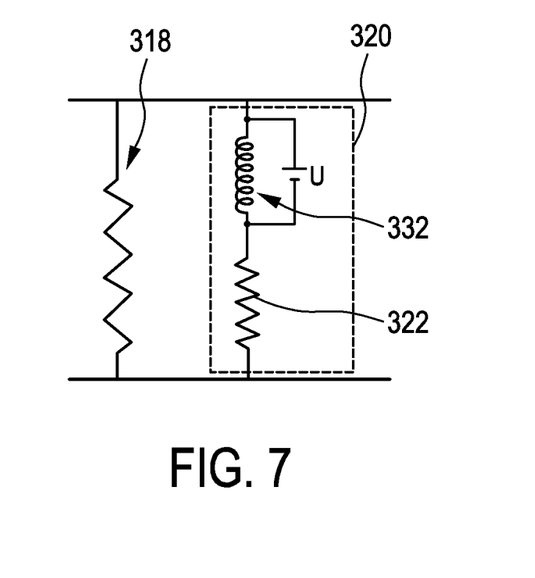
FIG. 7 shows a yet further modification to a spring device similar to FIG. 2 with an additional spring composed of a memory alloy.

A yet further refinement of the invention is illustrated in FIG. 7. In addition to a spring 318, a spring device further has the additional means 320, outlined by dashed lines in the said figure. The additional means 320 consist of an additional spring 322 which, however, is advantageously a normal helical spring composed of metal. The said additional means is connected in series to a further additional spring 332 which is composed of a metal alloy with a memory effect, that is to say has a memory effect. The said memory effect is temperature-dependent. The variant illustrated here is designed in such a way that the further additional spring 332 can even be directly heated itself by current throughflow, as is illustrated. As an alternative, heating elements can of course also be provided, as in FIGS. 2 to 6, or else further heating elements can be provided, such as, for example, an inductive heating arrangement around the outside of the further additional spring 332. This reduces problems in respect of electrical connection and insulation.

It can also be provided in the case of the additional means 320 of FIG. 7 to change the spring constant by heating, specifically by changing the shape of the further additional spring 332 composed of memory metal by heating and the said further additional spring becoming harder or softer, alternatively longer or shorter. This also influences the spring constant of the additional means 320 in a predictable manner and therefore influences the spring properties of the entire spring device of the washing machine. Depending on the configuration of the further additional spring 332, the additional spring 322 could also be dispensed with in the case of the additional means 320 here. A further additional spring composed of memory metal which is then provided can then also be made softer or harder and/or longer or shorter by heating. A resonance point can, as described above, also be readily overcome in this way.

In principle, there is even the option, already described above, of not activating heating elements at all for overcoming the resonance point. A basic state is then even no coupling of additional springs or the like. The heating elements are also required only when the said coupling is required. If the said heating elements are designed in a corresponding manner, activation of this kind can be performed in a few seconds since the heating elements can be designed such that they respond very quickly and therefore their heating effect develops very quickly. The coupling means and/or springs heated by the said heating element can also react very quickly. As an alternative, heating can start as early as when the rotation speed of the laundry drum 14 of the washing machine 11 is ramped up, so that, when it can be predicted that the resonance point will be reached and exceeded, this additional coupling effect and/or spring effect is already present. When the resonance point is then overcome and the prevailing frequency is at least 5% or better at least 10% above the resonant frequency at the current rotation speed of the laundry drum 14 without activated coupling means and/or spring means, the said coupling means and/or spring means can be deactivated. The provision of complex force or vibration sensors can then be dispensed with under certain circumstances.

That which is claimed:

1. Spring device for suspending or for spring-mounting a functional unit of an electrical appliance, wherein said spring device has:
    at least one main spring means and at least one additional spring means, and coupling means for coupling said at least one additional spring means to a portion of said spring device,
    wherein at least one of:
        said at least one spring means has a spring constant or spring properties which are temperature-dependent and are variable by a temperature effect on said at least one spring means, or
        said coupling means are designed in a temperature-dependent manner in such a way that said coupling means vary their coupling effect between said at least one additional spring means and said spring device by a temperature effect, and
    wherein heating means are provided for at least one of said at least one main spring means, said at least one additional spring means, or said coupling means for the purpose of warming up at least one of said at least one main spring means, said at least one additional spring means, or said coupling means and for the purpose of changing at least one of said spring properties or said coupling effect thereof.

2. Spring device according to claim 1, wherein at least one of said at least one main spring means or said at least one additional spring means is a metal spring, which is in a portion at least partially composed of a metal alloy with a temperature-dependent memory effect.

3. Spring device according to claim 2, wherein said heating means are designed for heating said portion composed of said metal alloy with said memory effect with a subsequent change in said spring constant or said spring properties due to said heating and warming up.

4. Spring device according to claim 2, wherein at least one of said at least one main spring means or said at least one additional spring means is a helical spring.

5. Spring device according to claim 2, wherein said at least one additional spring means is at least partially composed of said metal alloy with said temperature-dependent memory effect.

6. Spring device according to claim 2, wherein said heating means are directly connected to a portion composed of said metal alloy with said temperature-dependent memory effect.

7. Spring device according to claim 1, wherein at least one of said at least one additional spring means or said at least one main spring means are a pneumatic spring with an air volume, wherein said air volume is located in an air chamber.

8. Spring device according to claim 7, wherein said heating means are associated with said air chamber for heating said air volume.

9. Spring device according to claim 7, wherein said heating means are arranged on an outside of said air chamber or are mounted onto an outer side of said air chamber.

10. Spring device according to claim 7, wherein a piston is arranged in the air chamber, said piston being able to be moved along said air chamber, and said piston separating off said air volume.

11. Spring device according to claim 7, wherein
    a piston is arranged in said air chamber, said piston being able to be moved along said air chamber, and said piston separating said air chamber into a first air volume and into a second air volume,
    said piston is arranged between said first air volume and said second air volume,
    said first air volume and said second air volume are closed off,
    at least one of said first air volume or said second air volume are heatable by means of said heating means.

12. Spring device according to claim 11, wherein:
    said heating means comprises a first heating means and a second heating means, the first and second heating means being configured for independent activation relative to one another;
    said first heating means is provided for said first air volume; and
    said second heating means is separately provided for said second air volume.

13. Spring device according to claim 1, wherein said heating means have a resistance heating element.

14. Spring device according to claim 13, wherein said heating means have a resistance heating element in the form of a flat heating element.

15. Spring device according to claim 14, wherein said flat heating element is a thick-layer heating element.

16. Spring device according to claim 1, wherein said spring device has a damping device on said functional unit.

17. Method for influencing a spring device according to claim 1 in an electrical appliance comprising a movable functional unit being spring-mounted by means of said spring device, wherein said functional unit of said electrical appliance is spring mounted by means of said spring device and has a resonant frequency,
wherein at least one of:
at least one of said at least one main spring means or said at least one additional spring means of said spring device is heated for changing its spring properties, or
said coupling means are heated for changing a coupling effect between at least one of said at least one main spring means or said at least one additional spring means and said spring device.

18. Method according to claim 17, wherein varying at least one of said spring properties or said coupling effect is not performed continuously but rather in steps.

19. Method according to claim 18, wherein varying at least one of said spring properties or said coupling effect is performed in steps with a total of only two steps of 0% and 100%.

20. Method according to claim 17, wherein, when said resonant frequency is reached, said spring properties are changed in such a way that said spring constant of at least one of said at least one main spring means or said at least one additional spring means is increased by at least 5%.

21. Method according to claim 17, wherein, when a frequency of movement has reached at least 80% of said resonant frequency, said spring properties are changed in such a way that said spring constant of at least one of said at least one main spring means or said at least one additional spring means is increased by at least 5%.

22. Method according to claim 17, wherein, when a frequency has reached at least 80% of said resonant frequency, said coupling effect is greatly increased in such a way that at least one of said at least one main spring means or said at least one additional spring means spring means is fully effectively coupled to said spring device or connected to said spring device.

23. Method according to claim 22, wherein said coupling effect is greatly increased in such a way that at least one of said at least one main spring means or said at least one additional spring means spring means is rigidly coupled and connected to said spring device.

24. Spring device for suspending or for spring-mounting a functional unit of an electrical appliance, wherein said spring device has:
at least one spring means, and
coupling means for coupling said at least one spring means to another portion of said spring device,
wherein at least one of:
said at least one spring means has a spring constant or spring properties which are temperature-dependent and are variable by a temperature effect on said at least one spring means, or
said coupling means are designed in a temperature-dependent manner in such a way that said coupling means vary their coupling effect between said at least one spring means and said spring device by a temperature effect, and
wherein:
heating means are provided for at least one of said at least one spring means or for said coupling means for the purpose of warming up at least one of said at least one spring means or said coupling means and for the purpose of changing at least one of said spring properties or said coupling effect thereof,
said at least one spring means comprise a pneumatic spring with an air volume, said air volume being located in an air chamber,
a piston is arranged in said air chamber, said piston being able to be moved along said air chamber, said piston separating said air chamber into a first air volume and into a second air volume,
said piston is arranged between said first air volume and said second air volume,
said first air volume and said second air volume are closed off, and
at least one of said first air volume or said second air volume are heatable by means of said heating means.

25. Spring device according to claim 24, wherein:
said heating means comprises a first heating means and a second heating means, the first and second heating means being configured for independent activation relative to one another;
said first heating means is provided for said first air volume; and
said second heating means is separately provided for said second air volume.

26. Spring device according to claim 25, wherein said at least one spring means is a metal spring, which is in a portion at least partially composed of a metal alloy with a temperature-dependent memory effect.

27. Spring device according to claim 26, wherein said heating means are designed for heating said portion composed of said metal alloy with said memory effect with a subsequent change in said spring constant or said spring properties due to said heating and warming up.

28. Method for influencing a spring device in an electrical appliance comprising a movable functional unit being spring-mounted by means of said spring device,
wherein said functional unit of said electrical appliance is spring mounted by means of said spring device and has a resonant frequency, wherein the method comprises the steps of:
providing a spring device comprising:
at least one spring means, and
coupling means for coupling said at least one spring means to another portion of said spring device,
wherein at least one of:
said at least one spring means has a spring constant or spring properties which are temperature-dependent and are variable by a temperature effect on said at least one spring means, or
said coupling means are designed in a temperature-dependent manner in such a way that said coupling means vary their coupling effect between said at least one spring means and said spring device by a temperature effect, and
wherein heating means are provided for at least one of said at least one spring means or for said coupling means,
at least one of heating said spring means of said spring device for changing its spring properties, or heating said coupling means for changing a coupling effect between
said at least one spring means and said spring device, and wherein, when a frequency has reached at least 80% of said resonant frequency, said coupling effect is greatly increased in such a way that said at least one spring means is fully effectively coupled to said spring device or connected to said spring device.

29. Method according to claim 28, wherein said coupling effect is greatly increased in such a way that said at least one spring means is rigidly coupled and connected to said spring device.

\* \* \* \* \*